March 4, 1924.
F. S. SHIELDS
COMBINED PLOW AND SOIL PULVERIZER
Filed Oct. 30, 1922
1,485,819
4 Sheets—Sheet 4
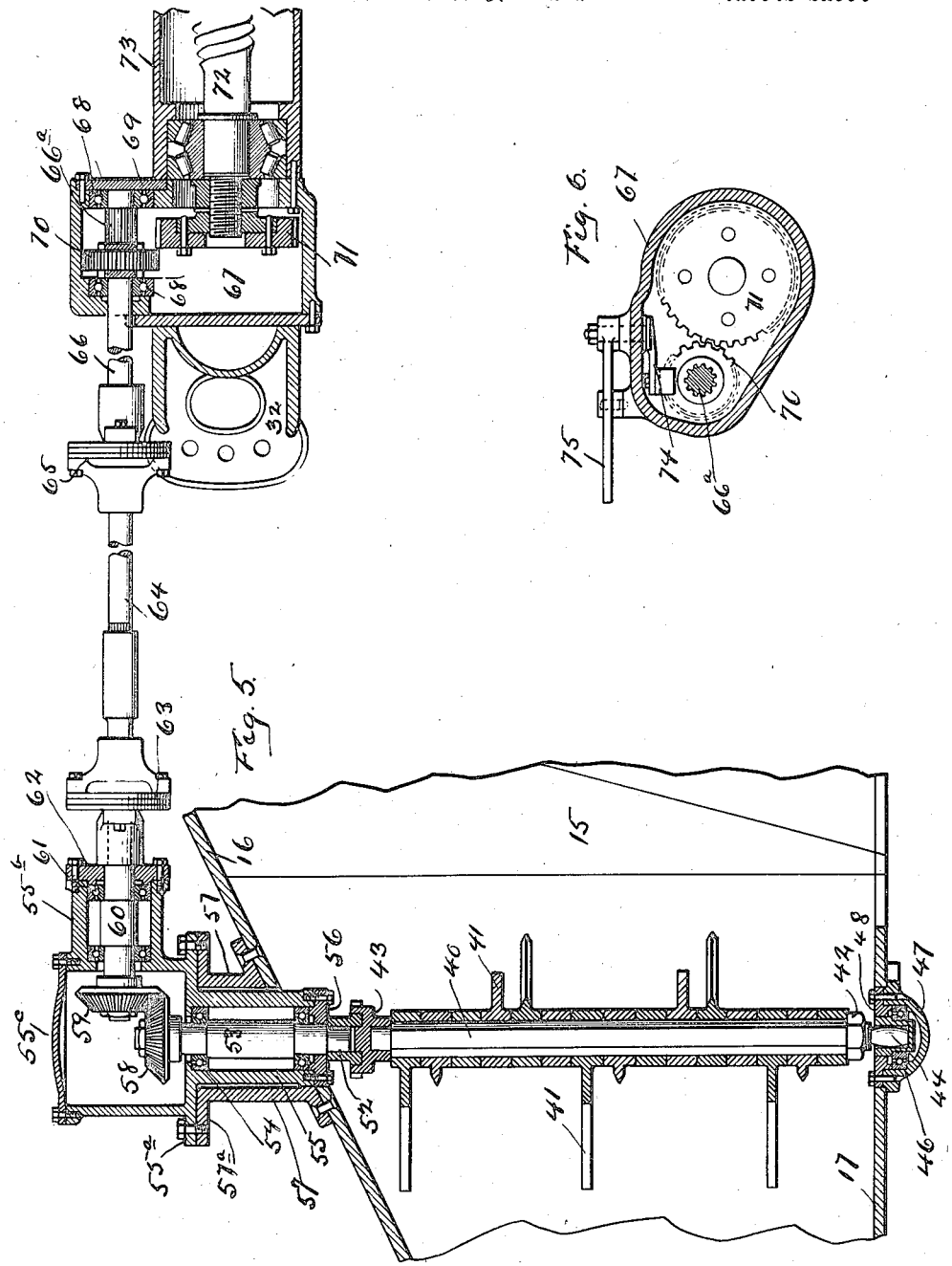
Inventor
F. S. Shields
By
Hill Brock & West
Attys.

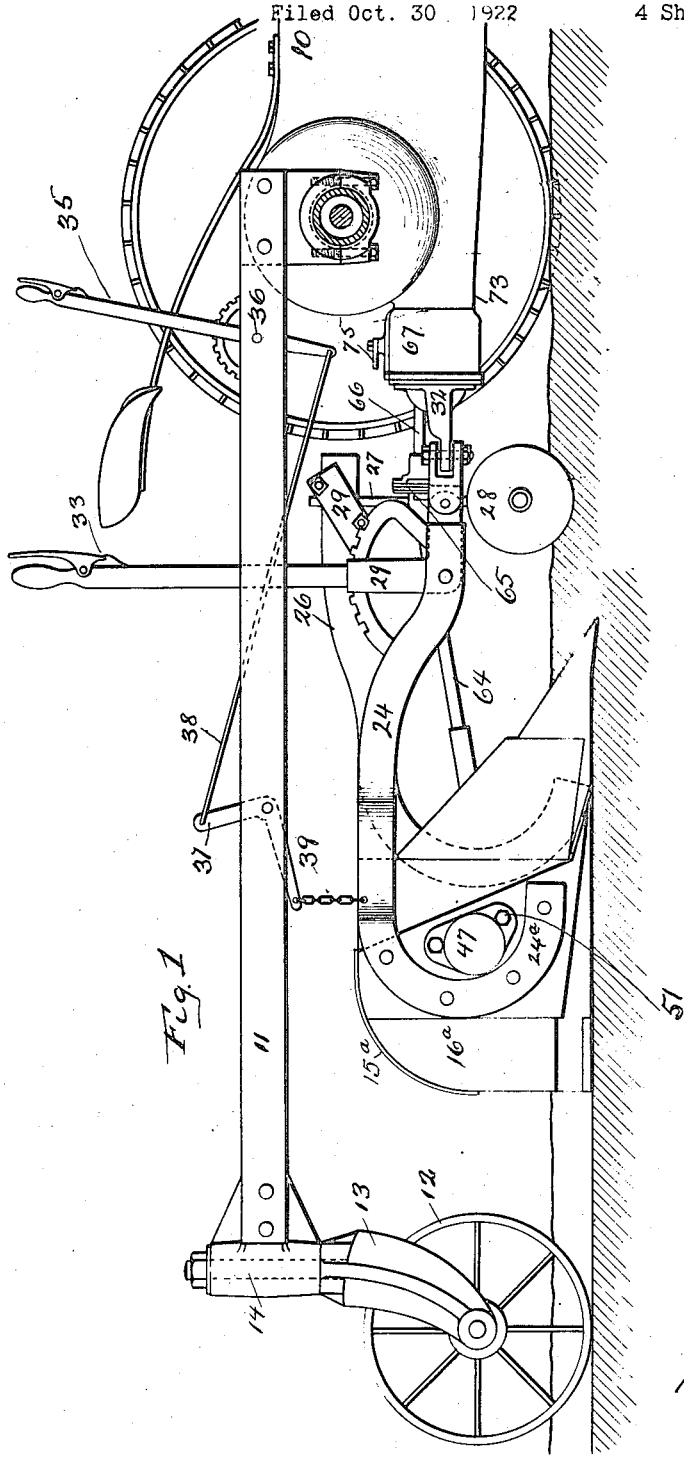

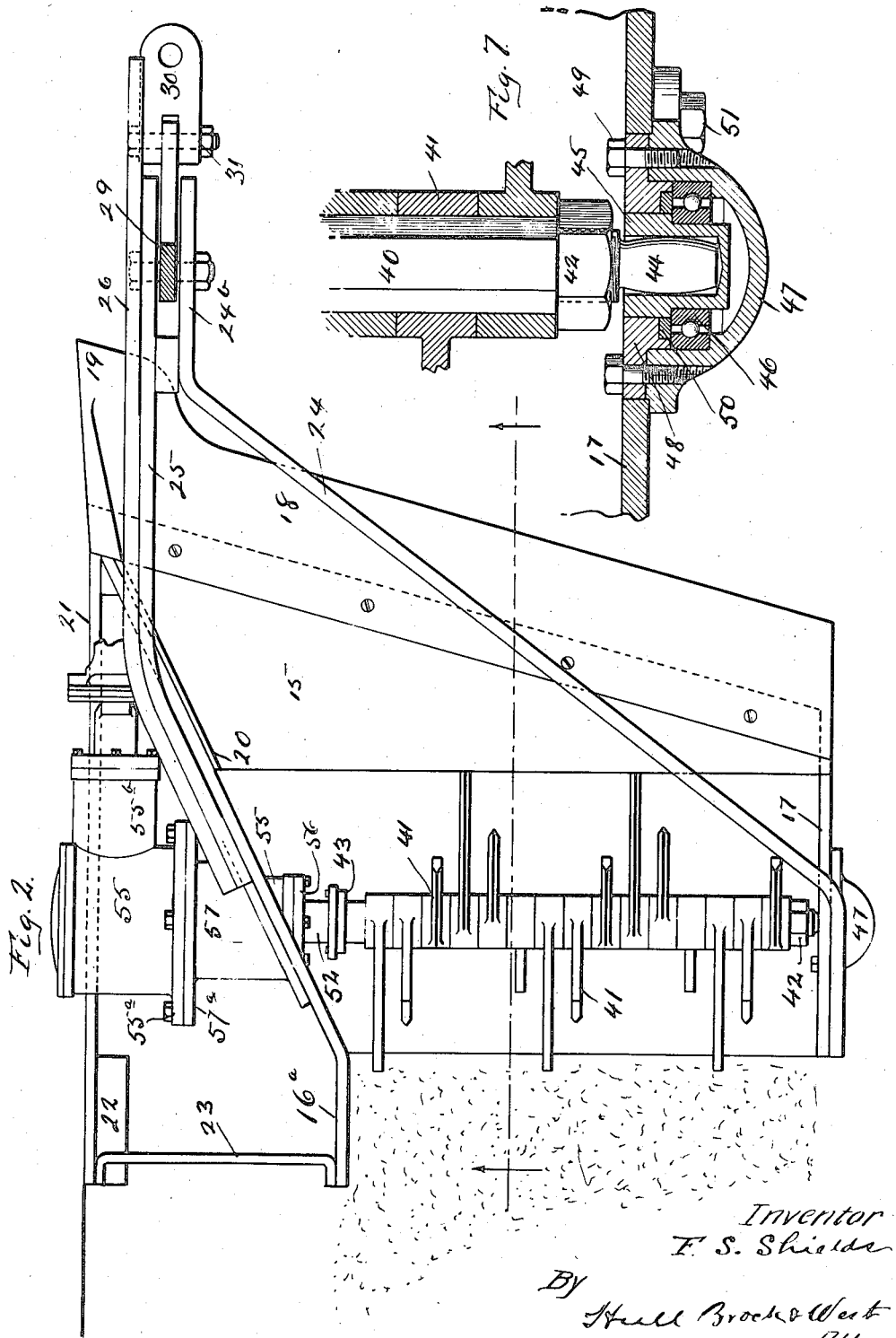

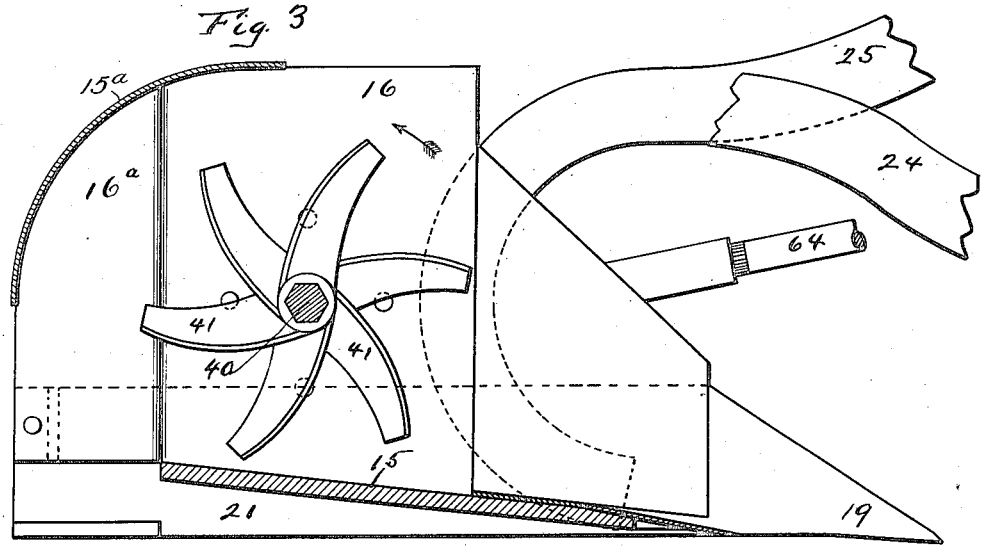
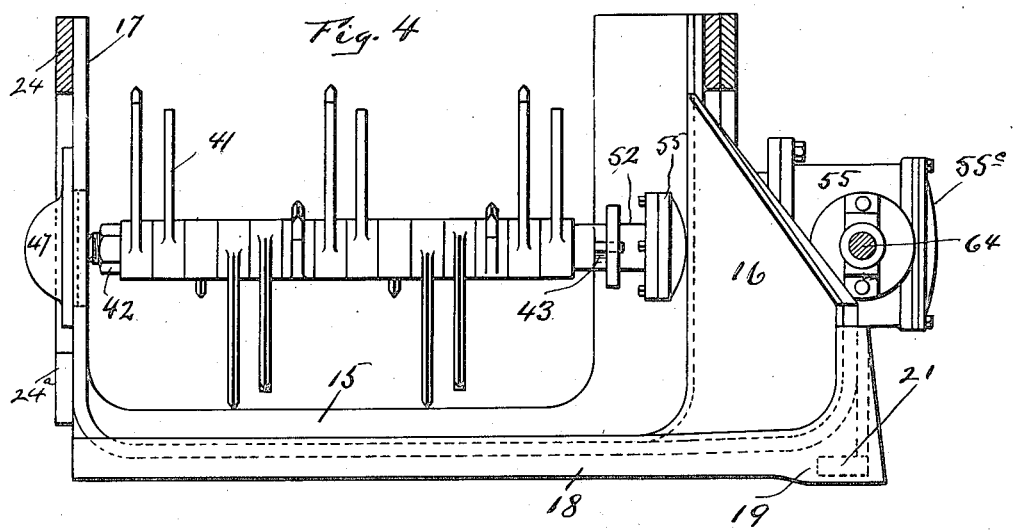

Patented Mar. 4, 1924.

1,485,819

UNITED STATES PATENT OFFICE.

FRANK S. SHIELDS, OF CLEVELAND, OHIO.

COMBINED PLOW AND SOIL PULVERIZER.

Application filed October 30, 1922. Serial No. 597,805.

*To all whom it may concern:*

Be it known that I, FRANK S. SHIELDS, a citizen of the United States, residing at Cleveland, in the county of Cuyahoga and State of Ohio, have invented a certain new and useful Improvement in Combined Plows and Soil Pulverizers, of which the following is a full, clear, and exact description, reference being had to the accompanying drawings.

This invention relates generally to plows and more particularly to a combined plow and soil pulverizer, the object of the invention being to provide a strong, durable and at the same time simple, device which can be attached to a tractor, and which will operate to lift or turn up a definite thickness of the soil, break the same into fine particles and deposit the pulverized soil at the rear and to one side, leaving a well defined furrow for the guidance of the machine for subsequent rows, and other purposes.

Another object of the invention is to provide a device which can be quickly, easily, and conveniently attached to various types of tractors, one which can be quickly and easily raised or lowered as desired, and one in which stones or other obstructions will pass safely through without damage to the operative parts of the device.

Another object of the invention is to so construct the various parts that they can be quickly and easily taken apart for repairs or replacement, and another object is to so arrange the various bearings as to safeguard the same against dust and dirt.

With these various objects in view the invention consists in the various novel features of construction, and in the manner of combining and arranging the same, all of which will be fully described hereinafter and set forth in the appended claims.

In the drawings forming a part of this specification Fig. 1 is a side view of a plow embodying one form of my invention and connected to the rear end of a tractor; Fig. 2 is a top plan view of the plow detached from the tractor and illustrating the manner of providing the furrow; Fig. 3 is a sectional elevation on the line 3—3 of Fig. 2; Fig. 4 is a front view of the plow proper and soil pulverizer or breaker; Fig. 5 is a sectional view partly in elevation of the soil pulverizer or breaker and means for actuating the same; Fig. 6 is a detail sectional view on the line 6—6 of Fig. 5; and Fig 7 is an enlarged sectional view of the outer bearing for the crusher or breaker shaft.

Referring to the drawings 10 indicates the rear portion of a tractor and 11 a rearwardly extending frame supported at the rear by the caster wheel 12 mounted in the yoke 13 which is swiveled or pivoted to the rear end of the frame as indicated at 14.

The plow is in the nature of a flat scoop comprising the bottom portion 15, the inner side wall 16 and the outer side wall 17, these walls 16 and 17 extending upwardly at right angles to the bottom 15, but the inner wall 16 is arranged obliquely with reference to the line of draft as most clearly shown in Figs. 2 and 5, so that the rear end of the scoop is slightly narrower than the forward end thereof and to the forward end of the scoop I attach the plow share or blade 18 which is formed with the point 19, and in practice I prefer to face the bottom and walls of the scoop with a smooth sheet metal lining 20 to facilitate the passage of the earth or soil.

The plow is also provided with a straight land-side 21 the forward end of which is inserted into or connected to the point portion of the plow share and extends straight to the rear as most clearly shown in Fig. 2 and is provided at its rear end with a shoe 22. The rear end of the land-side is rigidly positioned with reference to the rear end of the inner wall 16 by means of a brace 23 and it will be noted that the extreme rear end of the wall 16 is straightened as shown at 16ª in Fig. 2 and extends somewhat to the rear of the wall 17.

Connected to the plow or scoop are the plow beams 24 and 25, the beam 24 being connected to the outer side of the outer wall 17 of the plow or scoop and the beam 25 connected to the inner side of the inner wall 16, and it will be noted that the rear end of the beam 24 is curved at its points of attachment to the outer wall 17, as indicated at 24ª, the purpose of such curvature being fully explained hereafter. The beam 24 extends obliquely across the body of the plow or scoop and is then projected forwardly as shown at 24ᵇ in parallel relation with the forward end of the beam 25, the rear portion of the beam 25 being bent obliquely as shown in order to contact with the oblique wall 16 of the plow or scoop.

26 indicates a bar which is parallel with and is connected to the bar 25 for a portion of its length and is in the nature of a reinforcement at its points of contact with said bar, but the forward end of the bar 26 is extended upwardly as shown in Fig. 1 and has the shank 27 of the colter 28 connected thereto by means of the clip 25.

Between the forward parallel portions of the beams 24 and 25 there is pivoted the elbow lever 29 which at its forward end is pivotally connected to the clevis 30 by means of the pivot bolt 31, the clevis 30 being in turn connected to a clevis plate 32 projecting from the rear end of the tractor as most clearly shows in Figs. 1 and 5. The lever 29 is provided with the usual spring latch 33 for engagement with the toothed segment 34 in order to hold the lever in its adjusted position and it will be understood that by moving the lever back and forth the plow beams and plow can be lowered or raised as desired and I also provide a lever 35 pivoted at 36 to the frame 11 and connected to a bell crank lever 37 through the medium of a rod 38, the bell crank lever at its lower end being connected by a chain 39 to the plow beam 24 for the purpose of raising the rear end of the plow when desired.

The plow or scoop as it is drawn forward by the tractor digs into the earth a definite distance and the quantity of earth or soil which is turned up passes rearwardly over the bottom and between the side walls of the scoop and as the inner wall is arranged obliquely, the earth will be diverted to one side to the extent of obliquity of the inner wall, and the land side 21 traveling in a straight line will produce the proper wall in the furrow and as the earth is deposited at the rear of the scoop at the contracted end thereof the space between the land side and the end of the inner wall of the scoop will provide an ample width of furrow.

It is desirable to break up or pulverize the earth as it passes through the scoop and in order to do so I provide a rapidly rotating breaker or pulverizer comprising a shaft 40 which extends horizontally across the scoop adjacent the rear end thereof and supported a sufficient distance above the bottom thereof. The shaft 40 has arranged thereon a series of blades or knives 41 held in place at the outer end by means of a nut 42 screwed upon the threaded end of the shaft and at the opposite end by means of a combined collar and clutch 43. The outer end of the shaft 40 is made round and slightly tapers in both directions as shown at 44, this rounded end being inserted in a bearing cap 45 which has its reduced outer portion inserted in a roller bearing 46. This roller bearing 46 is inserted in a housing 47 which, in connection with a ring 48 connected thereto by bolts 49, constitutes a bearing for the outer end of the rotary shaft which is thoroughly protected against dust and dirt, a felt washer 50 being interposed in the channeled portion of the ring 48 for the purpose of protecting the ball bearing. The end 44 of the shaft fitting loosely in the bearing cup 45 permits a limited amount of movement and consequently does away with accurate fitting, and any dust or dirt which might accumulate in the cup 45 will produce no bad results, the delicate portions of the bearing being thoroughly protected as most clearly shown in Fig. 7. The bearing thus described is fitted into an opening in the outer wall of the scoop and is secured by means of bolts 51, and it will be noted by reference to Fig. 1 that the end of the plow beam 24 is curved around as indicated at 24$^a$ in order to provide a secure attachment to the side wall of the scoop and at the same time provide the proper space for the introduction and connection of the bearing for the shaft 40.

The inner end of the shaft 40 as previously described fits into the combined collar and clutch dog 43, said clutch dog 43 cooperating with a similar clutch dog 52 fastened upon the end of the shaft 53, said shaft being mounted in the ball bearings 54 which in turn are arranged in a housing 55, the end of the housing which projects through an opening in the inner wall of the scoop being closed by a plate or collar 56. The cylindrical portion of the housing 55 is inserted in a tubular support 57 flanged at its opposite ends and secured to the wall of the scoop 16, and the flange portion 55$^a$ of the housing 55 is securely connected to the flanged portion 57$^a$ of the tubular support and in this manner the housing is quickly, durably and accurately secured to the scoop.

In the enlarged portion of the casing 55 and upon the end of the shaft 53 I mount a beveled gear 58 which meshes with a similar gear 59 mounted upon the shaft 60 which is journaled in roller bearings 61 mounted in the forwardly extending portion 55$^b$ of the housing and the forward end of the shaft is connected to a universal joint 63, and a forwardly extending shaft 64 is in turn connected with a second universal joint 65, and extending therefrom is the shaft 66 which enters the housing 67 which is secured to the rear end portion of the tractor 10. The shaft 66 turns in roller bearings 68, and the forward side of the housing 67 is closed by means of a plate 69. A pinion 70 is slidably mounted upon the forward end of the shaft 66, said forward end being toothed as shown at 66$^a$ so as to have the pinion 70 rotatably connected with the shaft 66 at all times, and this pinion 70 is adapted to be shifted into engagement with the gear 71 mounted upon the rear end of the worm shaft 72, which constitutes a portion of the tractor, this worm shaft 72 being arranged in the rearwardly extending portion 73 of the tractor as most clearly shown in Figs. 1 and 5. The pinion 70 is shifted by means of the arm 74 operated by means of the lever 75 arranged upon the exterior of the housing or casing 67 as most clearly shown in Figs. 1 and 6. This lever 75 is within easy reach of the foot of the operator and by moving the same back and forth the pinion can be thrown into or out of mesh as desired.

In the construction shown in Fig. 5 the part 32 and the parts 73 and 72 are parts of the tractor, and in order to adapt my invention thereto it has only been necessary to apply the gear 71 to a nut applied to the end of the worm shaft and provide the housing 67 to which the portion 32 is connected.

In this manner I am able to quickly and easily connect my device to one of the standard types of tractors and the same principle can also be applied to other types of tractors, it being only necessary to provide the gear connection for the pinion carried upon the shaft 66. This shaft 66 is ordinarily arranged horizontal, and the shaft 64 inclined, and the shaft 60 also straight or horizontal, but it will of course be understood that certain variations of these parts may be had without departing from the broad principle of my invention.

It will be noted that only few moving parts are required and that these moving parts are completely covered by strong and durable and conveniently arranged housings or casings applied at points convenient for the purposes intended. The housing 55 is provided with a cap plate 56° for closing that portion of the housing within which the gears 58 and 59 are contained.

In operation the plow or scoop is connected to the tractor by coupling the clevis 30 to the clevis portion 32 and is then adjusted at the proper height. As the tractor moves forwardly the point of the plow-share digs into the ground and a definite depth of soil is lifted for the full width of the plow share 18 and as the plow continues forwardly this earth passes rearwardly over the bottom of the plow and due to the oblique side of the scoop this earth is crowded to the right.

As the soil passes rearwardly through the scoop it is subjected to the cutting and pulverizing action of the rotary knives or blades which are turning in the direction indicated by the arrow in Fig. 3, that is, they are turning forwardly and the earth is thoroughly broken up and delivered at the rear in a finely divided condition, and if desired, a cover 15ª can be applied to the rear end of the scoop in order to prevent the particles of dirt from being unduly thrown about.

The finely divided earth is discharged at the rear end of the scoop, and owing to the oblique side of the scoop a furrow space will be left between the inner wall of the scoop and the land side of the plow which furrow is highly desirable, and at the same time the earth has been thoroughly broken up and left in a finely divided state at the right hand side of the furrow and which is also very desirable.

By turning the blades forwardly as indicated any rock or other obstruction will be thrown off and discharged at the rear and consequently all danger of jamming or crowding is avoided.

In case it is desired to replace the knives or blades the shaft 40 can be quickly and easily removed, and any blade or blades removed and others replaced. The outer end of the shaft has a fairly loose fit in the cup bearing 45 and the inner end fits into the coupling collar 43 and by virtue of the interlocking connection between the collar 43 and the member 52 the shaft is rapidly rotated through the medium of the shaft 53.

By providing the various shafts with ball bearings properly protected, the loss by friction is reduced to the minimum and consequently I am able to rotate the breaker or pulverizer shaft easily and rapidly without detracting greatly from the power of the tractor.

It will thus be seen that I provide an exceedingly simple, durable and efficient attachment capable of carrying out all of the objects hereinbefore recited.

Having thus described my invention, what I claim is:

1. In a device of the kind described, a scoop having a bottom, an outer wall and an inner wall, said inner wall being oblique with reference to the line of draft, a plow share and point at the front of said scoop and a land-side extending rearwardly from the plow point.

2. In a device of the kind described, a scoop having a contracted rear end, a land-side at the inner side of said scoop and a plow share and point at the front of said scoop, and a horizontal rotating earth breaker or pulverizer arranged within the scoop and means for operating the same as the scoop is moved forwardly.

3. In a device of the kind described, a scoop having a contracted rear end, and provided with a land-side, a horizontal shaft provided with blades arranged in the scoop, a power shaft, a housing connected to one side of the scoop, power transmitting devices arranged in said housing and connected with the power shaft and blade carrying shaft.

4. In a device of the kind described, a scoop having a contracted rear end, and provided with a land-side, a horizontal shaft provided with blades, a bearing for said shaft detachably arranged at one side of the scoop, a housing arranged at the other side of the scoop, shafts and gears arranged in said housing, one of said shafts being coupled with the blade shaft, and a power shaft coupled with the other shaft.

5. In a device of the kind described, a tractor, a housing connected thereto, a driven shaft arranged in said housing and means for operatively connecting said shaft with the tractor shaft, a scoop, a blade carrying shaft arranged therein, means carried at one side of scoop for driving said shaft, and means including one or more universal joints for operating said means from said tractor.

6. In a device of the kind described, the combination with a tractor and rearwardly extending frame, of a scoop having forwardly projecting beams coupled at their forward ends with the tractor, said scoop having a rearwardly extending land-side, a horizontal blade carrying shaft journaled in the scoop and means carried by said scoop for operatively connecting said shaft with the tractor, together with means for raising and lowering the scoop.

7. In a device of the kind described, the combination with a tractor, of a plow or scoop coupled thereto, the inner wall of said scoop extending rearwardly outwardly whereby the rear end of said scoop is contracted, a plow share and point connected to the front of said scoop and a rearwardly extending land-side, the rear end of said land-side being spaced from the inner wall of the scoop, a horizontal blade carrying shaft journaled in the scoop, means carried by said scoop for operating said shaft and means for connecting said shaft operating means with power means of the tractor.

8. In a device of the kind described, a scoop having inner and outer side walls, a horizontal blade carrying shaft arranged within the scoop, a bearing detachably connected to the outer wall of the scoop and in which the outer end of the blade carrying shaft is journaled, a housing connected to the inner wall of the scoop, shafts arranged therein, one of said shafts being operatively connected with the blade carrying shaft, a driven shaft operatively connected with the second named shaft together with means for operating the driven shaft.

9. In a device of the kind described, a scoop having inner and outer side walls, a horizontal blade carrying shaft arranged in said scoop, a housing detachably connected to the outer wall of said scoop, said housing carrying a bearing for the outer end of said shaft and a protecting ring or plate connected to said housing.

10. In a device of the kind described, the combination with a blade carrying shaft the outer end of which is rounded and reduced, of a bearing cup in which said end is fitted, a roller bearing in which said cup bearing fits, a housing into which said roller bearing fits and a ring connected to said housing, positioning said cup bearing and protecting said roller bearing.

11. In a device of the kind described, the combination with a scoop having a bottom and inner and outer side walls, beams connected to said inner and outer walls, the said beams converging forwardly, a lever pivotally connected to said beams adjacent their forward ends, said lever being pivotally connected to a clevis member, said lever being adjustable to raise and lower the scoop.

12. In a device of the kind described, the combination with a tractor, of a scoop having a contracted rear end, a land-side extending rearwardly from the forward inner end of said scoop, the rear end of said land-side being spaced from the inner side of said scoop, beams connected to said scoop converging forwardly, a lever pivotally connected to said beams at their forward end, said lever being pivotally connected to a clevis member carried by the tractor, a rearwardly extending caster frame and means for raising and lowering the scoop connected to said frame.

13. In a device of the kind described, the combination with a housing adapted to be attached to a tractor, of a gear attached to the tractor shaft, a shaft mounted in said housing, and having a pinion movable thereon for engagement with said gear, a scoop coupled with said tractor, a rotary blade carrying shaft arranged in said scoop and means including one or more universal joints for operatively connecting the shaft in the housing with the blade carrying shaft.

14. In a device of the kind described, a scoop coupled to a tractor, the inner side of said scoop extending rearwardly outwardly and a land-side extending rearwardly from the forward end of said scoop, a blade carrying shaft journaled in said scoop, a housing comprising two portions arranged at right angles to each other, a housing support secured to the inner side of the scoop and to which the right angled housing is connected, a shaft arranged in each portion of the housing and gears connected to said shafts and meshing with each other in the housing, one of said shafts extending forwardly, and means including a universal joint for operatively connecting said forwardly extending shaft with the tractor.

In testimony whereof, I hereunto affix my signature.

FRANK S. SHIELDS.